US011295103B2

(12) United States Patent
Wang et al.

(10) Patent No.: US 11,295,103 B2
(45) Date of Patent: Apr. 5, 2022

(54) MULTIFUNCTIONAL HANDHELD SCANNER

(71) Applicant: CHAMPTEK INCORPORATED, New Taipei (TW)

(72) Inventors: Kuo-Chun Wang, New Taipei (TW); Shu-Ying Huang, New Taipei (TW); Cheng-Hsiang Hung, New Taipei (TW)

(73) Assignee: CHAMPTEK INCORPORATED, New Taipei (TW)

( * ) Notice: Subject to any disclaimer, the term of this patent is extended or adjusted under 35 U.S.C. 154(b) by 0 days.

(21) Appl. No.: 17/076,395

(22) Filed: Oct. 21, 2020

(65) Prior Publication Data
US 2021/0124888 A1 Apr. 29, 2021

(30) Foreign Application Priority Data
Oct. 28, 2019 (TW) .................................. 108138837

(51) Int. Cl.
*G06K 7/10* (2006.01)
*G06K 7/14* (2006.01)

(52) U.S. Cl.
CPC ....... *G06K 7/10881* (2013.01); *G06K 7/1443* (2013.01)

(58) Field of Classification Search
CPC ............ G06K 9/22; G06K 7/14; G06K 9/228; G06K 7/10881; G06K 7/109
(Continued)

(56) References Cited

U.S. PATENT DOCUMENTS 9,080,856 B2 * 7/2015 Laffargue ............. G01B 11/002
2009/0175318 A1 * 7/2009 Koenck ................. H04W 88/06
375/133
(Continued)

FOREIGN PATENT DOCUMENTS

CN 1302417 A 7/2001
CN 107449501 A 12/2017
(Continued)

OTHER PUBLICATIONS

Office Action dated Apr. 28, 2020 of the corresponding Taiwan patent application No. 108138837.
(Continued)

*Primary Examiner* — Edwyn Labaze
(74) *Attorney, Agent, or Firm* — Chun-Ming Shih; HDLS IPR Services

(57) ABSTRACT

A multifunctional handheld scanner includes a scanner main body (100) and a volume measuring module (200). The scanner main body (100) has a work surface (101) and a barcode capturing unit (102) exposed on the work surface (102). The volume measuring module (200) is disposed on the work surface (101) and has: photographic lenses (201*a*, 201*b*), an optical distance measuring unit (300) and an optical projection unit (400). The photographic lenses (201*a*, 201*b*) define a measuring zone (204). The optical distance measuring unit (300) is disposed corresponding to the measuring zone (204). The optical projection unit (400) projects an aiming indication cursor (410) toward a projection zone (401), wherein the projection zone (401) is located within the measuring zone (204).

12 Claims, 7 Drawing Sheets

(58) Field of Classification Search
USPC .................. 235/472.01, 470, 462.45, 375
See application file for complete search history.

(56) References Cited

U.S. PATENT DOCUMENTS

| | | | |
|---|---|---|---|
| 2013/0038719 A1* | 2/2013 | Canini | G06K 7/10722 |
| | | | 348/135 |
| 2015/0332075 A1* | 11/2015 | Burch | G06F 3/0425 |
| | | | 345/156 |
| 2017/0091571 A1 | 3/2017 | Canini et al. | |
| 2017/0094251 A1* | 3/2017 | Wolke | H04N 13/25 |
| 2019/0213389 A1 | 7/2019 | Peruch et al. | |

FOREIGN PATENT DOCUMENTS

| | | |
|---|---|---|
| CN | 109472176 A | 3/2019 |
| EP | 3435026 A1 | 1/2019 |
| TW | M592119 U | 3/2020 |
| WO | 2008154611 A2 | 12/2008 |

OTHER PUBLICATIONS

Search Report dated Mar. 10, 2021 of the corresponding European patent application No. 20203699.2.

\* cited by examiner

MULTIFUNCTIONAL HANDHELD SCANNER

BACKGROUND OF THE INVENTION

Field of the Invention

The present invention relates to a barcode scanner, especially to a multifunctional handheld scanner.

Description of Related Art

With the convenient store, the supermarket and the hypermarket being provided with more technologies, a barcode is printed on a product package or a bill, so that a barcode scanner can be utilized to read the barcode data for payment and collection so as to increase the efficiency of payment and collection.

However, the convenient store, the supermarket and the hypermarket also provide a home delivery service, when the store clerk receives a parcel, a measuring tape is used to measure whether the volume of the parcel being satisfied with the regulation, the manual measuring operation is time consuming and labor consuming, and a long waiting line at the check-out counter may occur. As such, how to combine a volume measuring means to the barcode scanner for the store clerk to easily operate so as to increase the efficiency of collection and receiving parcels shall be provided.

Accordingly, the applicant of the present invention has devoted himself for improving the mentioned disadvantages.

SUMMARY OF THE INVENTION

The present invention is to provide a multifunctional handheld scanner, in which a barcode capturing unit of a scanner main body is able to scan a barcode, a volume measuring module is able to measure a volume, thereby the multifunctional handheld scanner has the functions of scanning the barcode and measuring the volume.

In some embodiments of the invention, the present invention provides a multifunctional handheld scanner, which includes: a scanner main body, having a work surface and a barcode capturing unit exposed on the work surface; and a volume measuring module, disposed on the work surface and having: at least one photographic lens, defining a measuring zone; an optical distance measuring unit, disposed corresponding to the measuring zone; and an optical projection unit, projecting an aiming indication cursor toward a projection zone, wherein the projection zone is located within the measuring zone.

Accordingly, advantages achieved by the present invention are as follows. The aiming indication cursor may visually indicate the location of the measuring zone, so that a user may aim at the object to be measured via the aiming indication cursor for the object to be measured being located within the measuring zone.

DETAILED DESCRIPTION OF THE INVENTION

Some embodiments of the present invention will be described with reference to the drawings. These are, of course, merely examples and are not intended to be limiting.

Please refer from FIG. 1 to FIG. 7, the present invention provides a multifunctional handheld scanner including a scanner main body 100 and a volume measuring module 200.

Figure 1:
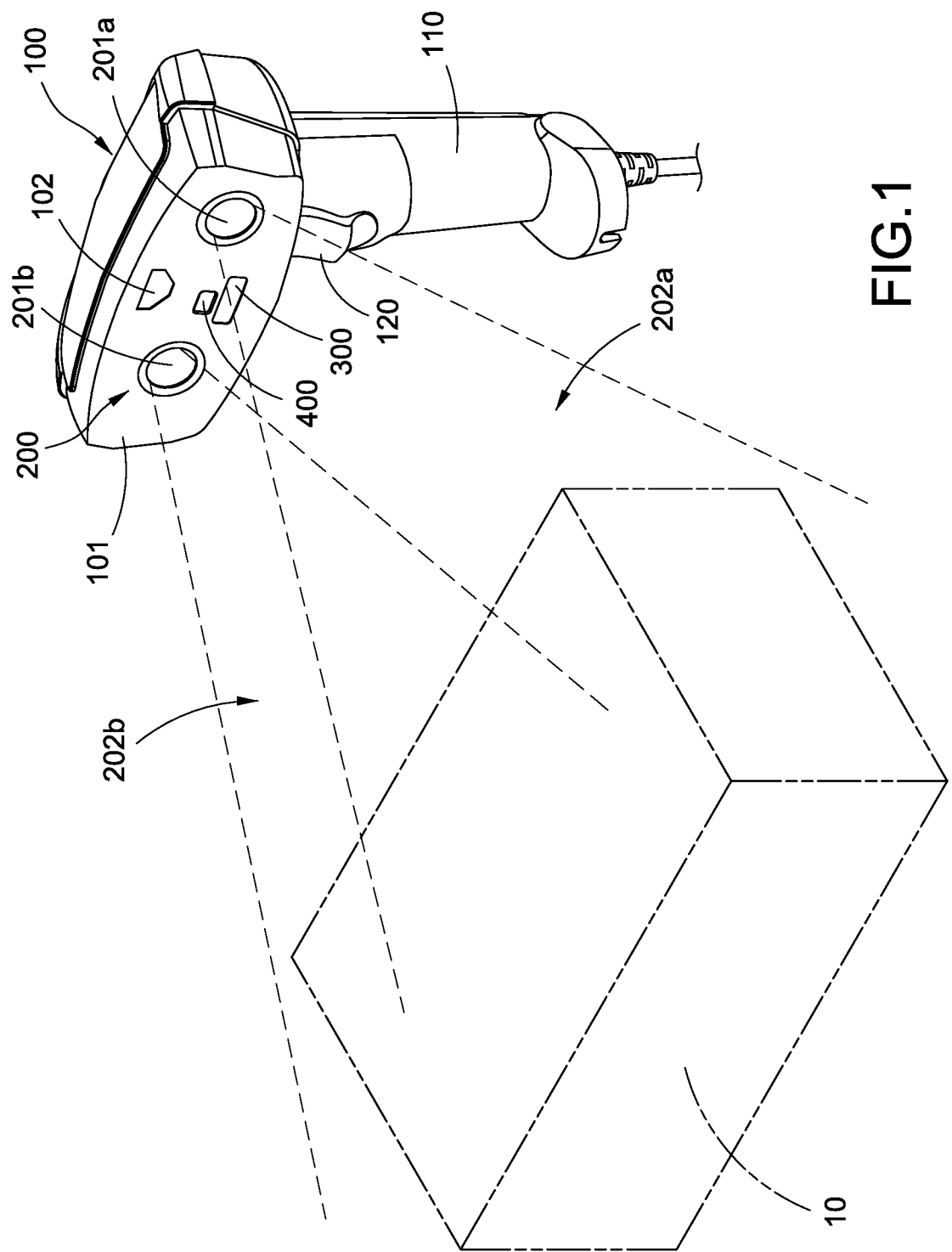
FIG. 1 is a schematic view showing an operating status of a multifunctional handheld scanner according to the present invention.
Figure 2:
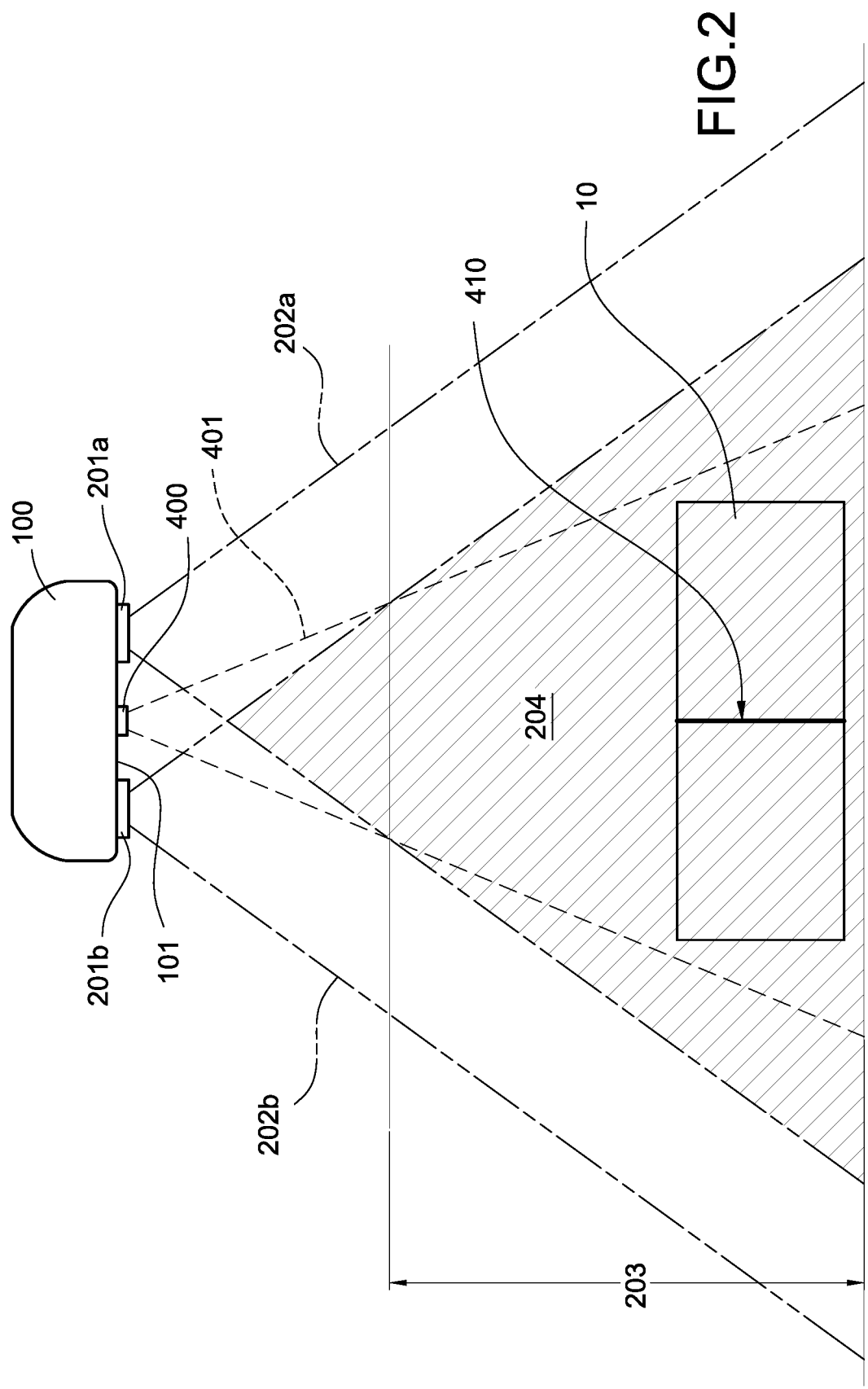
FIG. 2 is a schematic view showing another operating status of the multifunctional handheld scanner according to the present invention.

As shown in FIG. 1 and FIG. 2, a work surface 101 is formed on an outer surface of the scanner main body 100 and a barcode capturing unit 102 is exposed on the work surface 101, a decoder (not sown in figures) is installed in the scanner main body 100, and the barcode capturing unit 102 may be a photographic lens or a combination of a light emitter and a sensor.

Details are provided as follows. When the barcode capturing unit 102 is the photographic lens, the barcode capturing unit 102 may receive an image signal after correspondingly scanning a barcode, and the image signal is converted into an electric signal by the barcode capturing unit 102. When the barcode capturing unit 102 is the combination of the light emitter and the sensor, the light emitter may emit light corresponding to the barcode and the light is reflected so as to form a light signal, the light signal is received and converted into an electric signal by the sensor. Moreover, the decoder (not shown in figures) may translate the obtained electric signal into a corresponding code, then the corresponding code is inputted to a computer or a mobile device, for example a tablet or a mobile phone.

The work surface 101 is preferably but not limited to a planar surface, the work surface 101 may also be composed of a plurality of sub-surfaces such that the normal-lines thereof are arranged parallel to each other. The work surface 101 may also be a curved surface. The work surface 101 may also be composed of a plurality of sub-surfaces such that the normal-lines thereof have slight or certain included angles therebetween.

As shown from FIG. 1 to FIG. 4, the volume measuring module 200 is disposed on the work surface 101 and has two photographic lenses 201a, 201b, an optical distance measuring unit (optical rangefinder) 300 and an optical projection unit 400. The amount of the photographic lenses 201a, 201b is not limited to two, and the amount of the photographic lenses 200a, 200b may be one or plural according to actual needs.

The work surface 101 provides the barcode capturing unit 102, each of the photographic lenses 201a, 201b, the optical distance measuring unit 300 and the optical projection unit 400 to be disposed thereon and substantially oriented towards a same direction. According to this embodiment, each of the photographic lenses 201a, 201b, the optical distance measuring unit 300 and the optical projection unit 400 are arranged towards the same direction, or each of the photographic lenses 201a, 201b may be arranged to be slightly rotated toward the other photographic lenses 201b, 201a.

Each of the photographic lenses 201a, 201b is disposed on the work surface 101, each of the photographic lenses 201a, 201b has an image capturing zone 202a, 202b forwardly extended from each of the photographic lenses 201a, 201b, each of the image capturing zones 202a, 202b is a view angle range of each of the photographic lenses 201a, 201b. Generally, each of the image capturing zones 202a, 202b is a conical space which is forwardly expanded and extended from each of the photographic lenses 201a, 201b. As such, each of the photographic lenses 201a, 201b may respectively capture an image within each of the image capturing zones 202a, 202b. Each of the photographic lenses 201a, 201b has a resolution range 203 at a front end of each of the photographic lenses 201a, 201b, the resolution range 203 is a range between a minimum distance and a maximum distance that each of the photographic lenses 201a, 201b may focus and resolve, so that each of the photographic lenses 201a, 201b may identify the image of an object to be measured 10 disposed in a distance within the resolution range 203. Moreover, the two images capturing zones 202a, 202b partially overlap so as to form a measuring zone 204 in the resolution range 203.

The optical distance measuring unit 300 is disposed on the work surface 101. Generally, the optical distance measuring unit 300 has a light emitting element and a light receiving element, or the photographic lenses 201a, 201b may be used as the distance measuring light receiving units. The light emitted by the light emitting element is reflected by the object to be measured 10 and received by the light receiving element, then a difference between the emitted light and the reflected light is compared thereby a distance between the optical distance measuring unit 300 and the object to be measured 10 is determined. Accordingly, the distance between the optical distance measuring unit 300 and the object to be measured 10 within the distance measuring zone 204 may be determined via the optical distance measuring unit 300.

The full images of the object to be measured 10 within the measuring zone 204 respectively captured by the photographic lenses 201a, 201b are compared. The images captured by each of the photographic lenses 201a, 201b are processed with an image identifying operation for obtaining a two-dimensional coordinate for each of a plurality of end-points of the object to be measured 10 in the two images, and the two set of two-dimensional coordinates are converted into a three-dimensional coordinate according to the distance measured by the optical distance measuring unit 300, and a length, a width and a depth of the object to be measured 10 are obtained with further calculation based on the three-dimensional coordinate so as to calculate a volume thereof.

The optical distance measuring unit 300 is preferably to be disposed between the two photographic lenses 201a, 201b for directly facing the object to be measured 10 within the measuring zone 204, thereby the distance between the optical distance measuring unit 300 and the object to be measured 10 within the measuring zone 204 may be precisely measured.

The optical projection unit 400 is disposed on the work surface 301, and the optical projection unit 400 may forwardly project a visible light within a projection zone 401, the visible light is arranged for projecting and displaying an aiming indication cursor 410. Generally, the projection zone 401 is a conical space forwardly expanded and extended from the optical projection unit 400, and the projection zone 401 is located in the measuring zone 204 within the resolution range 203. When the object to be measured 10 is disposed within the measuring zone 204, the object to be measured 10 blocks the visible light projected by the optical projection unit 400 and the visible light projects and displays the aiming projection cursor 410 on the object to be measured 10.

The optical projection unit 400 is preferably to be disposed between the two photographic lenses 201a, 201b for the projection zone 401 coinciding with the measuring zone 204, the optical distance measuring unit 300 and the optical projection unit 400 are arranged adjacently in vertical direction, so that the projection zone 401 and a measuring location of the optical distance measuring unit 300 may be coincided.

At least a portion of the aiming indication cursor 410 is located at an edge of the measuring zone 204. The aiming indication cursor 410 is arranged to cross the measuring zone 204 along two different directions intersected with each other. As such, a user may aim the object to be measured 10 via the aiming indication cursor 410, and the object to be measured 10 is located within the measuring zone 204. Specifically, when the aiming indication cursor 410 is projected on a surface of the object to be measured 10 and extended to an edge of the object to be measured 10, the user may know that the whole object to be measured 10 does not exceed a projection range of the aiming indication cursor 410, in other words, the object to be measured 10 is located within the measuring zone 204 for measuring.

Figure 3:
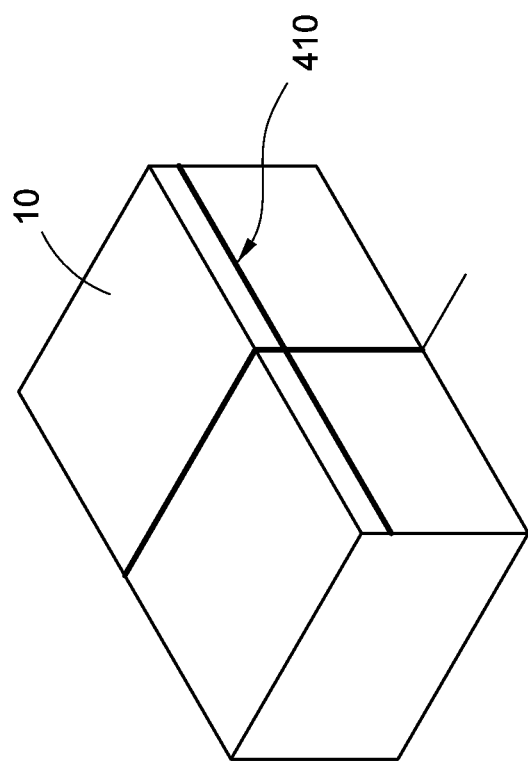
FIG. 3 is a schematic view showing the object to be measured being projected with the aiming indication cursor.
Figure 4:
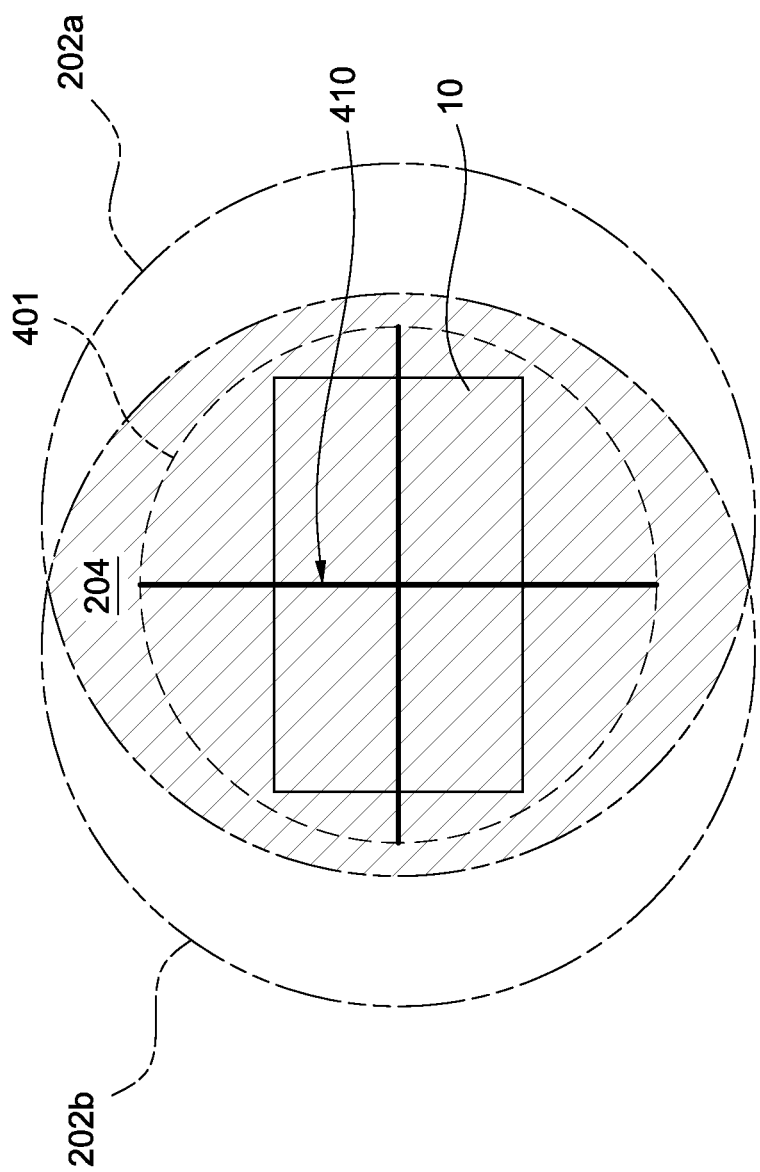
FIG. 4 is another schematic view showing the object to be measured being projected with the aiming indication cursor.
Figure 5:
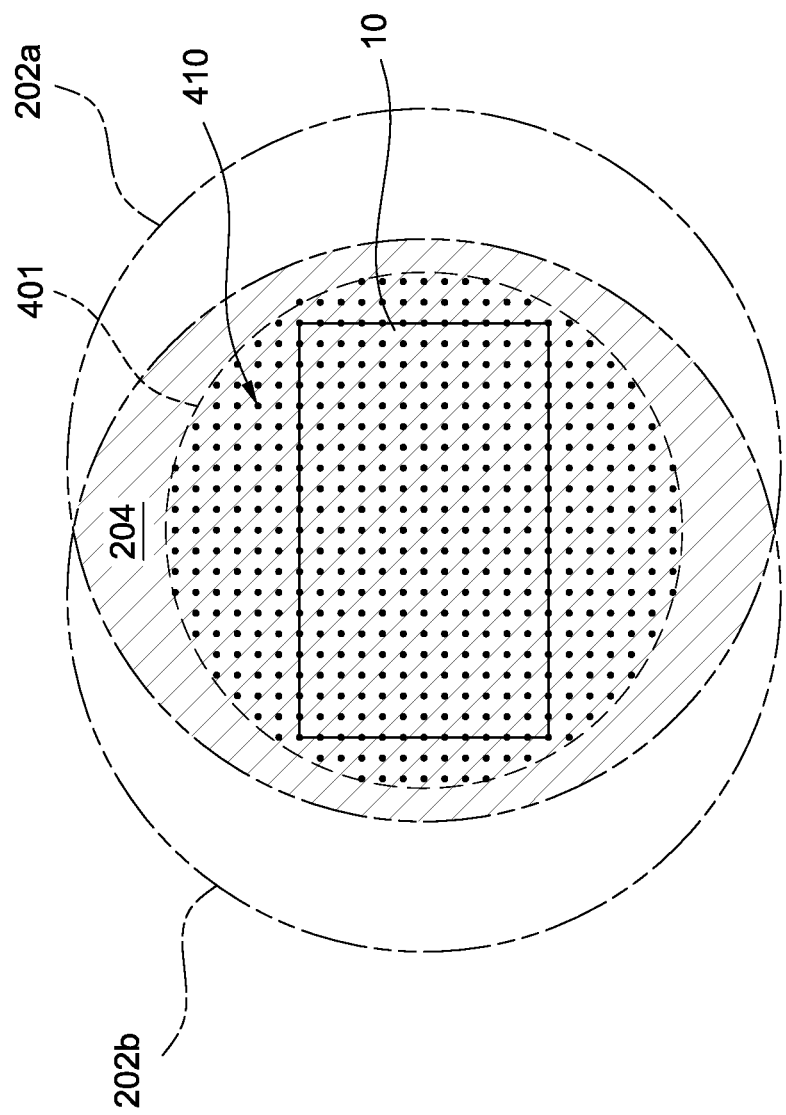
FIG. 5 is a schematic view showing the aiming indication cursor according to another embodiment of the present invention.

According to the embodiment shown in FIG. 3 and FIG. 4, the aiming indication cursor 410 may be a pair of intersecting linear lines, and preferably to be a horizontal line and a vertical line which perpendicularly intersect at a center of the measuring zone 204. According to the embodiment shown in FIG. 5, the aiming indication cursor 410 may also be mesh points distributed in the measuring zone 204, and at least a portion of the mesh points are arranged along two different sides of the measuring zone 204 (the two different sides are intersected with each other) and located in the measuring zone 204, but two ends of each row (or column) of the mesh points does not exceed the measuring zone 204.

Accordingly, the aiming indication cursor 410 may visually indicate the location of the measuring zone 204, so that the user may aim the object to be measured 10 via the aiming indication cursor 410, and the object to be measured 10 may be more precisely located in the measuring zone 204, thereby allowing the user to easily operate and calculate the correct volume.

The scanner main body 100 may be a mobile device, for example a mobile phone or a tablet, or a handheld device with an extended handle 110, the scanner main body 100 may be optionally disposed with a switch 120 for driving the optical projection unit 400, or may be optionally disposed with a displaying device 130 for displaying a barcode data captured by the barcode capturing unit 102, the image captured and the volume calculated by the photographic lenses 201a, 201b.

Moreover, the multifunctional handheld scanner further includes an electronic scaling unit 500, the electronic scaling unit 500 is connected to the scanner main body 100, or the scanner main body 100 is electrically connected to a scale device 20, and the electronic scaling unit 500 or the scale device 20 is used for scaling a weight of the object to be measured 10.

Figure 6:
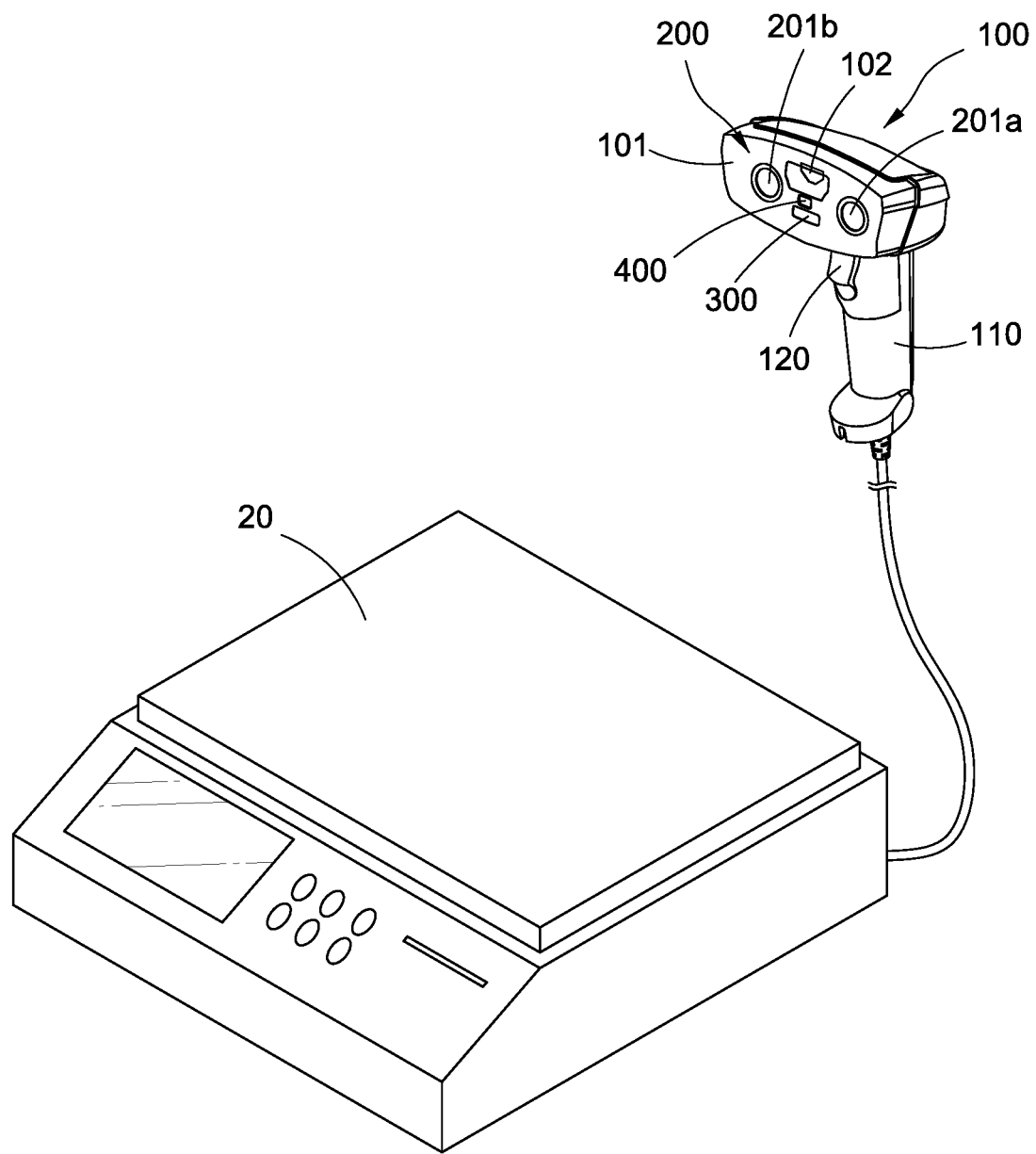
FIG. 6 is a schematic view showing the multifunctional handheld scanner according to another embodiment of the present invention.

Details are provided as follows. As shown in FIG. 1 and FIG. 6, the scanner main body 100 may be a general gun-like barcode scanner, the handle 110 is provided for the user to hold, one side of the handle 110 is disposed with the switch 120 for driving the optical projection unit 400, the work surface 101 is formed at one side of a top end of the handle 110, the scanner main body 100 may be electrically connected to the scale device 20, a computer or a mobile phone by a transmission line or a wireless means, for example Bluetooth, for outputting respectively or collectively the barcode data captured by the barcode capturing unit 102 and the volume data calculated by the volume measuring module 200 to the scale device 20, a computer or a display of a mobile phone.

Figure 7:
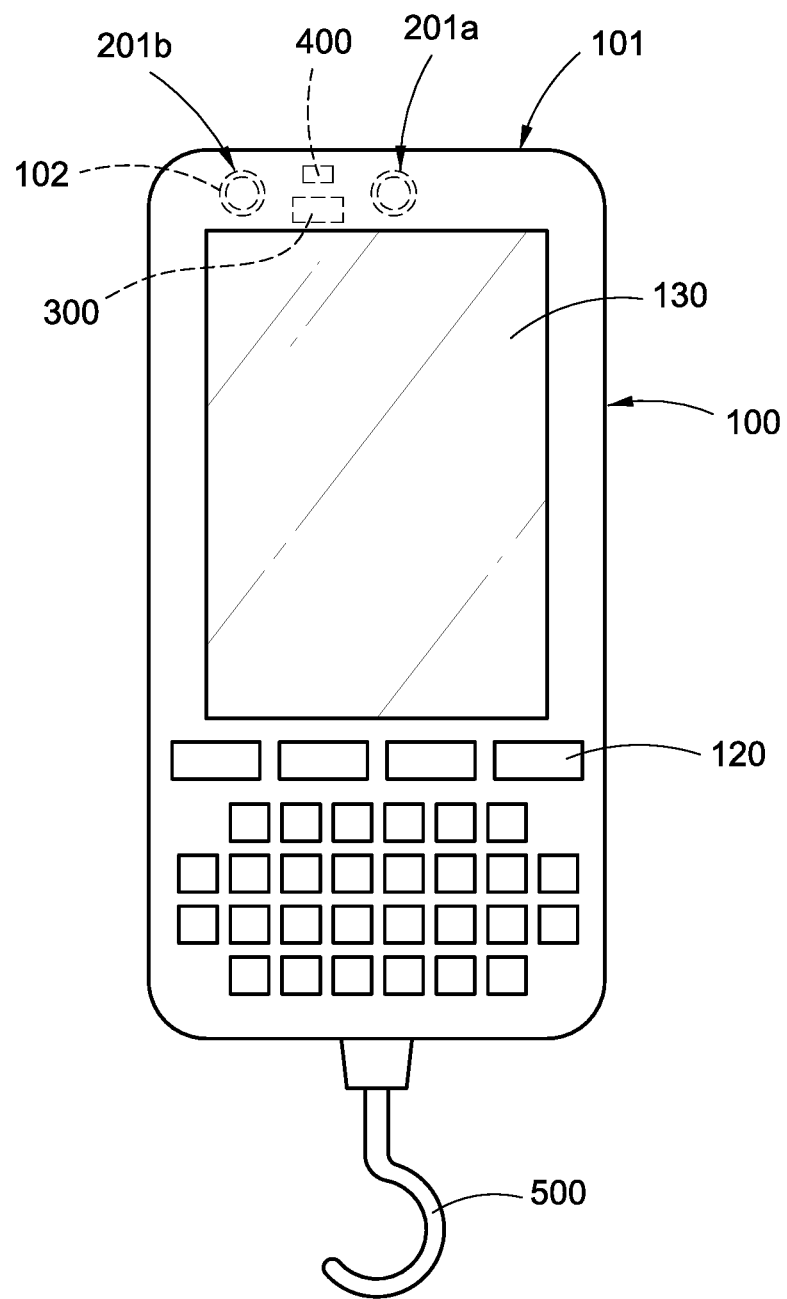
FIG. 7 is a schematic view showing the multifunctional handheld scanner according to one another embodiment of the present invention.

Please refer to FIG. 7, the scanner main body 100 may also be a type of mobile phone, the work surface 101 is formed on one surface of the scanner main body 100, another surface of the scanner main body 100 is disposed with the displaying device 130 for displaying the images captured by the photographic lenses 201a, 201b, and the scanner main body 100 may also be optionally disposed with the switch 120 for driving the optical projection unit 400, the electronic scaling unit 500 is connected to a bottom of the scanner main body 100, so that the weight measured by the electronic scaling unit 500 may be outputted to the displaying device 130.

As shown in FIG. 7, when the barcode capturing unit 102 is the photographic lens, the barcode capturing unit 102 may be combined with at least one of the photographic lenses 201a, 201b, in other words the image captured by at least one of the photographic lenses 201a, 201b may be used for the following purposes of reading the barcode and calculating the volume.

Accordingly, the barcode capturing unit 102 of the scanner main body 100 may scan the barcode, the volume measuring module 200 may measure the volume, and the electronic scaling unit 500 may measure the weight, thereby the multifunctional handheld scanner has the functions of scanning the barcode and measuring the volume and the weight.

Although the present invention has been described with reference to the foregoing embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A multifunctional handheld scanner, comprising:
    a scanner main body (100), comprising a work surface (101) and a barcode capturing unit (102) exposed on the work surface (102); and
    a volume measuring module (200), disposed on the work surface (101) and comprising:
    at least one photographic lens (201a, 201b), defining a measuring zone (204);
    an optical distance measuring unit (300), disposed corresponding to the measuring zone (204); and
    an optical projection unit (400), projecting an aiming indication cursor (410) toward a projection zone (401), wherein the projection zone (401) is located within the measuring zone (204),
    wherein the aiming indication cursor (410) visually indicates a location of the measuring zone (204), so that a user aims an object to be measured via the aiming indication cursor (410), and the object to be measured is more precisely located in the measuring zone (204), thereby allowing the user to easily operate and calculate a correct volume.

2. The multifunctional handheld scanner according to claim 1, wherein the amount of the photographic lenses (201a, 201b) is two, each of the photographic lenses (201a, 201b) is configured to capture an image within an image capturing zone (202a, 202b) extended forwardly from each of the photographic lenses (201a, 201b); and each of the photographic lenses (201a, 201b) is configured to identify image within a resolution range (203) at a front end of each of the photographic lenses, and the pair of image capturing zones (202a, 202b) are partially overlapped so as to form the measuring zone (204) in the resolution range (203).

3. The multifunctional handheld scanner according to claim 2, wherein at least a portion of the aiming indication cursor (410) is located at an edge of the measuring zone (204).

4. The multifunctional handheld scanner according to claim 1, wherein the aiming indication cursor (410) is arranged to cross the measuring zone (204) along two different directions intersected to each other.

5. The multifunctional handheld scanner according to claim 1, wherein each of the image capturing zones (202a, 202b) is a conical space expanded and extended from each of the photographic lenses (201a, 201b).

6. The multifunctional handheld scanner according to claim 1, wherein the projection zone (401) is a conical space expanded and extended from the optical projection unit (400).

7. The multifunctional handheld scanner according to claim 1, wherein the optical distance measuring unit (300) and the optical projection unit (400) are arranged adjacently in vertical direction and disposed between the pair of photographic lenses (201a, 201b).

8. The multifunctional handheld scanner according to claim 1, wherein the scanner main body (100) is a mobile device.

9. The multifunctional handheld scanner according to claim 1, wherein the scanner main body (100) comprises a handle (110) extended from the scanner main body (100).

10. The multifunctional handheld scanner according to claim 1, wherein the scanner main body (100) comprises a switch (120) driving the optical projection unit (400); and the scanner main body (100) comprises a displaying device (130) displaying image captured by the photographic lenses (201a, 201b).

11. The multifunctional handheld scanner according to claim 1, further comprising: an electronic scaling unit (500) connected to the scanner main body (100).

12. A multifunctional handheld scanner, comprising:
    a scanner main body (100), comprising a work surface (101) and a barcode capturing unit (102) exposed on the work surface (102); and
    a volume measuring module (200), disposed on the work surface (101) and comprising:
    at least one photographic lens (201a, 201b), defining a measuring zone (204);
    an optical distance measuring unit (300), disposed corresponding to the measuring zone (204); and
    an optical projection unit (400), projecting an aiming indication cursor (410) toward a projection zone (401), wherein the projection zone (401) is located within the measuring zone (204);
    wherein the amount of the photographic lenses (201a, 201b) is two, each of the photographic lenses (201a, 201b) is configured to capture an image within an image capturing zone (202*a*, 202*b*) extended forwardly from each of the photographic lenses (201*a*, 201*b*); and each of the photographic lenses (201*a*, 201*b*) is configured to identify image within a resolution range (203) at a front end of each of the photographic lenses, and the pair of image capturing zones (202*a*, 202*b*) are partially overlapped so as to form the measuring zone (204) in the resolution range (203);

wherein at least a portion of the aiming indication cursor (410) is located at an edge of the measuring zone (204).

\* \* \* \* \*